United States Patent [19]

Inoue

[11] Patent Number: 4,521,660
[45] Date of Patent: Jun. 4, 1985

[54] EDM FEED MOTOR CONTROL METHOD AND SYSTEM

[75] Inventor: Kiyoshi Inoue, Tokyo, Japan

[73] Assignee: Inoue-Japax Research Incorporated, Yokohama, Japan

[21] Appl. No.: 349,512

[22] Filed: Feb. 17, 1982

[30] Foreign Application Priority Data

Feb. 18, 1981 [JP] Japan .................................. 56-23313

[51] Int. Cl.³ .............................................. B23P 1/08
[52] U.S. Cl. .............................. 219/69 W; 219/69 M; 219/69 P
[58] Field of Search ............... 219/69 M, 69 W, 69 S, 219/69 G, 69 P, 69 R, 69 E, 68

[56] References Cited

U.S. PATENT DOCUMENTS

| | | | |
|---|---|---|---|
| 3,531,615 | 9/1970 | Zammit | 219/69 G |
| 3,536,881 | 10/1970 | Inoue | 219/69 G |
| 3,581,045 | 5/1971 | Panschow et al. | 219/69 G |
| 3,694,599 | 9/1972 | Davis | 219/69 G |
| 4,288,675 | 9/1981 | Inoue | 219/69 M |
| 4,383,160 | 5/1983 | Obara | 219/69 W |

FOREIGN PATENT DOCUMENTS

| | | | |
|---|---|---|---|
| 3129133 | 4/1982 | Fed. Rep. of Germany | |
| 5565033 | 5/1980 | Japan | 219/69 W |

Primary Examiner—M. H. Paschall
Attorney, Agent, or Firm—Karl F. Ross; Herbert Dubno

[57] ABSTRACT

A stepping feed EDM motor control method and system in which the rate of driving of a motor for each step of incremental advance of the movable electrode, e.g. a tool electrode or a workpiece electrode, is controlled in accordance with the instantaneous area of the machining surface of the tool electrode juxtaposed in electroerosive machining relationship with the workpiece.

27 Claims, 9 Drawing Figures

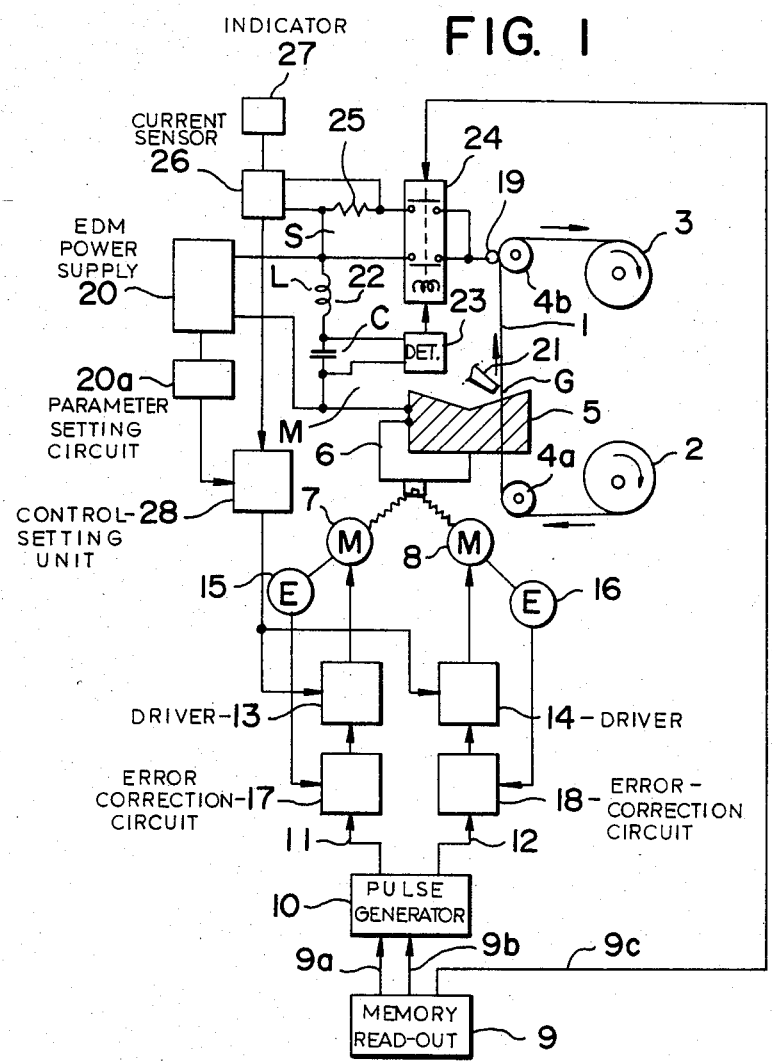
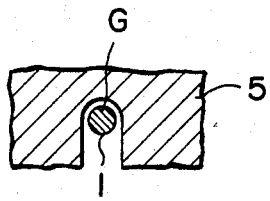
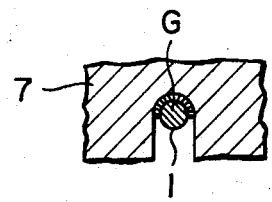

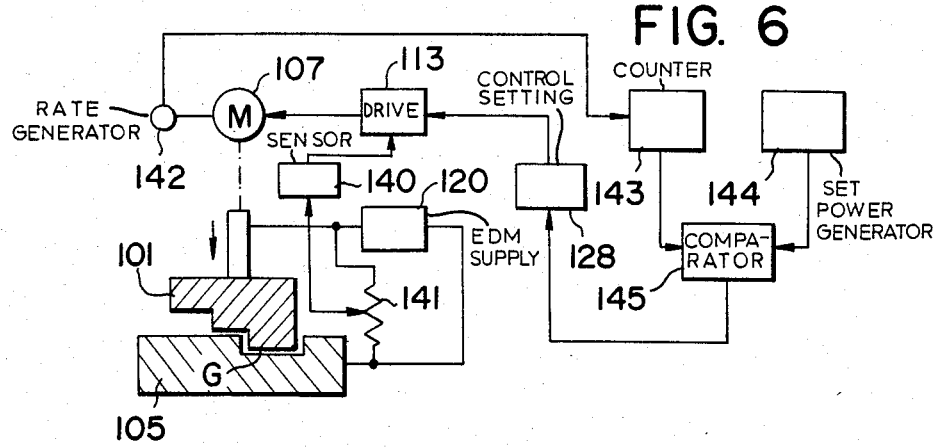

EDM FEED MOTOR CONTROL METHOD AND SYSTEM

FIELD OF THE INVENTION

The present invention relates to an electrical discharge machining (EDM) method and apparatus and, in particular, is concerned with a machining feed control method and system for electrical discharge machining.

BACKGROUND OF THE INVENTION

An EDM process is carried out by utilizing a tool electrode, e.g. in the form of a solid body or an axially traveling wire, spacedly juxtaposed with a conductive workpiece electrode across a machining gap filled with a liquid dielectric, e.g. a hydrocarbon or distilled water, and applying a series of electrical discharge pulses through the gap between the electrodes to electroerosively remove material from the workpiece electrode. As material removal proceeds, a machining feed must be effected between the tool and workpiece electrodes, by advancing one of them relative to the other, to continue material removal or machining in the workpiece while maintaining the machining discharge gap substantially constant. It is critical that the machining gap have a size as small as 10 $\mu$m (micrometers) or so. To maintain such a small gap, the movable electrode should be controlledly advanced to follow material removal but not to overtravel so as to cause a short-circuiting condition in the gap.

It has been known that a preferred EDM machining feed system hitherto proposed to this end makes use of a stepping motor drivingly coupled with the movable electrode and energized with a succession of drive pulses to advance the movable electrode incrementally or in successive steps. It has experimentally been found to be desirable that the movable electrode should advance a fixed incremental distance d as small as 1 $\mu$m (micrometer) or less to achieve best results. A desired overall advance displacement of distance D can thus be accomplished by n repetitions of the incremental displacement d, $n = D/d$, and hence by energizing the motor with n uniform drive pulses of a duration $\tau$ which defines the incremental displacement d.

With the prior system, however it has now been found that in an EDM machining feed the movable electrode for each required incremental advance, especially where the increment d set is as small as 1 $\mu$m, does not always respond quickly and accurately to a commanding drive pulse. As a consequence, each commanding drive pulse may actually result in a displacement shorter than the desired increment, or the overall advance may become continuous, rather than stepped as desired, and may not bring the movable electrode to a precise position as commanded by the sequence of incremental drive pulses applied to the motor. Thus, there may result a serious inaccuracy in the position reached in each machining feed block. Furthermore, the failure in stepping feed may cause overtravel of the movable electrode, tending to cause a short-circuiting condition in the gap and a failure in machining stability.

OBJECTS OF THE INVENTION

It is accordingly a principal object of the present invention to provide a novel and improved EDM method and apparatus which assure a machining feed displacement with due precision, thereby assuring machining precision and stability.

The present invention seeks to provide means in the stepping machining feed system whereby the amount of incremental advance of the movable electrode in each step is maintained constant over successive steps during a course of the electroerosive machining operation.

SUMMARY OF THE INVENTION

It has now been found that a delay in the response of the drive system to a commanding drive pulse occurs which varies as a function of the area of the machining surface of the tool electrode in machining relationship with the workpiece. In general, it has been determined that such a delay in response varies as a function of both the machining area and the area of each discharge crater and, more particularly, as a function of the variable $\alpha$ which is equal to the machining area divided by the area of a discharge crater. The machining area is the area of the surface of the tool electrode juxtaposed in erosive machining relationship with the workpiece, over which area successive electrical discharges take place generally randomly. The area of a discharge crater is the area of a crater created on the workpiece by an individual machining discharge and is generally a function of the peak current Ip and the pulse duration $\tau$on of the machining discharge. With both Ip and $\tau$on fixed as customarily is the case, the discharge crater area can be fixed. Accordingly, the delay in response of the drive system to a commanding drive pulse practically varies as a function of the machining area. For example, in machining a ferrous workpiece, it has been confirmed that the delay ranges from 2 to 3 ms (milliseconds); from 5 to 6 ms and from 10 to 50 ms when the variable $\alpha$ ranges less than 1000, in excess of 1000 and in excess of 10,000, respectively.

The present invention seeks to provide means for substantially removing such a change in response of the drive motor means which occurs as a function of the changing machining area.

Thus, in accordance with the present invention, there is provided a method of electroerosively machining an electrically conductive workpiece electrode with a tool electrode spacedly juxtaposed therewith across a dielectric-filled machining gap by applying a series of time-spaced electrical discharge pulses through the gap to remove material from the workpiece electrode, wherein a machining feed between the tool and workpiece electrodes, at least one of which is movable, is effected stepwise by motor means drivingly coupled with the movable electrode and adapted to be incrementally driven to advance the movable electrode in successive steps, thereby continuing electroerosion machining in the workpiece electrode and wherein the area of the surface of the tool electrode in electroerosive relationship with the workpiece electrode varies as machining is continued, which method comprises the steps of: (a) sensing the instantaneous area of said machining suface during the course of the machining feed; and (b) controlling the rate of driving of said motor means for each step of incremental advance of the movable electrode in accordance with said sensed machining area so as to maintain the amount of advance displacement in each incremental step over such successive steps substantially constant.

Specifically, the motor means is incrementally driven by energizing the same with a succession of drive pulses and the rate of driving of the motor means for each step of incremental advance of the movable electrode may be controlled by controlling the successive drive pulses individually so that each of the drive pulses causes a predetermined substantially constant amount of incremental advance displacement of the movable electrode in spite of change in the machining area during the continuation of machining.

To this end, successive drive pulses may be controlled by controlling either the magnitude or duration thereof or both. The magnitude of the successive drive pulses may be controlled to control or to even out the rate of response for driving of the motor means and may be controlled during only a portion of each drive pulse, preferably in an initial portion thereof. Alternatively, each of the successive drive pulses may comprise a main drive pulse and at least one auxiliary drive pulse superimposed thereon and the magnitude of the drive pulses may be controlled by controlling at least one of the magnitude and duration of the auxiliary drive pulse which may be superimposed upon the main drive pulse at least in an initial portion thereof.

In general, for controlling a said successive drive pulse, the following steps may be followed: establishing at least one parameter of the successive drive pulses which characterizes each drive pulse and affects the rate of driving of the motor means thereby for each step of incremental advance of the movable electrode; establishing a plurality of preselected different values to be selected for the parameter; establishing a plurality of predetermined different ranges for the varying machining area; establishing a correspondence respectively between the plural values for the parameter to be selected and the plural ranges for the machining area to be sensed; in response to the sensed instantaneous machining area, determing, out of the plural ranges, the range in which the sensed area falls; determining a value for the parameter corresponding to the determined range; and regulating the drive pulse to the motor means to acquire the determined value for the parameter.

The instantaneous area of the machining surface may be sensed in various modes. Thus, the machining feed may be intermittently interrupted to establish a sequence of time periods in which to sense the machining area in step (a). Such a sequence of time periods may also be established by intermittently interrupting the application of machining discharge pulses. In these cases, the controlled rate of driving of the motor means may be maintained during a time interval between one or each of these time periods to the next.

The motor means may as customary comprise at least two motors adapted to displace the movable electrode along at least two independent mutually orthogonal axes, respectively, to permit the machining feed to be effected multi-dimensionally in a coordinate system defined by the axes. The drive pulse are then distributed for selective application to the motors in response to command signals to cause the machining feed to follow a predetermined path in the coordinate system.

The drive signals should preferably be produced in response at least in part to a gap signal derived from the machining gap and are applied to the motor means to advance the movable electrode so as to maintain the size of the machining gap substantially constant.

The tool electrode may have a plurality of machining sections with the respective machining faces stepped in the advance direction with each extending perpendicular thereto and the instantaneous machining area may then be sensed by detecting the position of the tool electrode corresponding to entry of each of the machining faces into machining relationship with the workpiece electrode.

The instantaneous machining area may also be sensed by detecting the average rate of advance of the movable electrode during application of the discharge pulses. The average rate of advance may be detected by producing a series of pulses each in response to an incremental advance displacement of the movable electrode, determining the number of such incremental pulses in unit time and deriving a control signal therefrom as representative of the average rate of advance. The control signal is applied to the motor means for controlling the rate of driving thereof for each step of incremental advance of the movable electrode. Preferably, the number of such incremental pulses in unit time is compared with the number of machining discharge pulses effected across the gap to produce the control signal. The number of incremental pulses may also be counted in an integrating counter whose accumulation level is compared with a reference signal to provide the control signal.

The instantaneous machining area may also be sensed by temporarily interrupting the machining feed between the tool and workpiece electrodes, continuing the application of discharge pulses during the interruption until the discharges across the machining gap substantially cease, and, when the discharges across the gap substantially cease, measuring the leakage current across the gap for at least one further applied pulse, the leakage current providing an indication of the instantaneous machining area.

The amount of advance displacement of the movable electrode in each incremental step is maintained at a constant value preferably between 0.5 and 5 micrometers ($\mu$m) and more preferably around 1 micrometer.

The method of the present invention may further include the step of determining the area of a discharge crater created on the workpiece by an individual discharge pulse whereby the rate of driving of the motor means for each step of incremental advance of the movable electrode is controlled in step (b) in accordance further with the determined discharge crater area which can be defined by parameters of the discharge pulse, e.g. peak current Ip and duration $\tau$on, and specifically as a function of the ratio of the sensed instantaneous machining area and the determined discharge crater area.

The invention also provides, in a second aspect thereof, an apparatus for electroerosively machining an electrically conductive workpiece electrode with a tool electrode spacedly juxtaposed therewith across a dielectric-filled machining gap by applying a series of time-spaced electrical discharge pulses through the gap to remove material from the workpiece, at least one of the tool and workpiece electrodes being movable, which apparatus comprises: motor means drivingly coupled with the movable electrode and adapted to be incrementally driven for advancing the movable electrode in successive steps, thereby effecting a stepped machining feed between the tool and workpiece electrodes and continuing electroerosive machining in the workpiece electrode with the machining surface of the tool electrode whose area varies; means for sensing the instantaneous area of the machining surface during the course of machining feed; and means in response to the sensed machining area for acting on said motor means to control the rate of driving thereof for each step of incremental advance of the movable electrode so as to maintain the amount of advance displacement of the movable electrode in each incremental step substantially constant in spite of change in the machining area during the continuation of machining.

The motor means is incrementally driven with a succession of discrete time-spaced drive pulses furnished from a source thereof. The sensing means furnishes an output signal representing the sensed machining area which signal is applied to the drive pulse source to control at least one parameter of the drive pulses, e.g. the magnitude and/or duration thereof, so that each of the drive pulses causes a predetermined substantially constant amount of incremental advance displacement of the movable electrode in spite of change in the machining area during the continuation of machining.

BRIEF DESCRIPTION OF THE DRAWING

These and other objects and features of the present invention as well as advantages thereof will become more readily apparent from the following description of certain embodiments thereof made with reference to the accompanying drawing in which:

FIG. 1 is a schematic circuit diagram of one embodiment of the invention;

FIG. 2(a) is a cross-sectional view of part of a wire electrode and workpiece schematically illustrating the state at which relative displacement between the wire electrode and the workpiece has just been halted;

FIG. 2(b) is a similar view illustrating the state in which the production of electrical discharge cease;

FIG. 6 is a schematic circuit diagram of one other form of the invention utilizing another machining area sensing circuit;

FIG. 7 is a schematic circuit diagram of a further machining area sensing circuit which may be used in the practice of the invention; and FIG. 8 is a schematic illustration of another area detecting arrangement for carrying out the invention:

SPECIFIC DESCRIPTION

Figure 3:
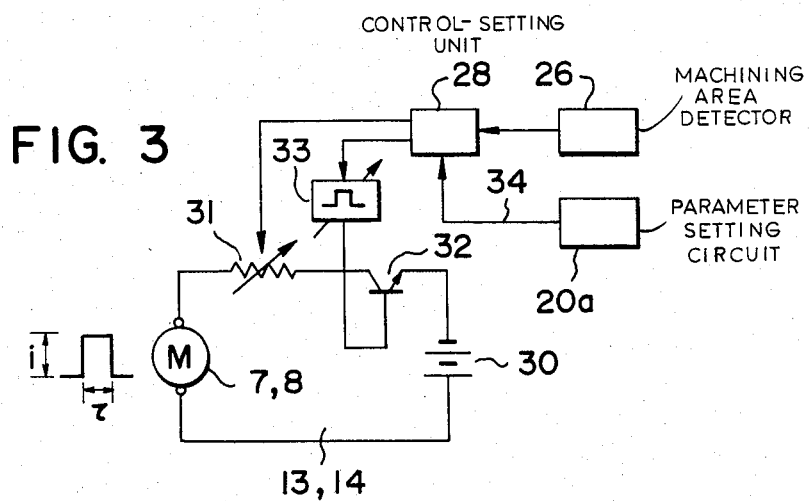
FIG. 3 is circuit diagram illustrating a motor control circuit according to the invention.

Referring first to FIG. 1 which shows a traveling-wire EDM arrangement, the principles of the invention may be described. A wire electrode 1 is shown to be continuously fed from a supply spool 2 and wound onto a takeup spool 3, the wire being stretched over and between guide rollers 4a and 4b under the action of a drive roller (not shown) provided on the takeup side and a brake roller (not shown) provided on the supply side to maintain a predetermined tension in the wire 1.

A workpiece 5 is securely mounted on a worktable 6 and disposed between the guide rollers 4a and 4b in electroerosive relationship with the traveling-wire electrode 1. The table 6 supporting the workpiece 5 is displaced in an x-y plane by means of an x-axis drive motor 7 and a y-axis drive motor 8 which are energized with drive pulse furnished from a preprogrammed control unit 9.

Each of the motors 7 and 8 when energized by a drive pulse is designed to be driven through a predetermined angle of rotation to drive the worktable 6 and hence the workpiece 5 along each of the x- and y-axes which are mutually orthogonal and in the x-y plane by a predetermined increment of displacement, say, 1 $\mu$m (micrometer). The control unit 9 may be a reader for the read-out of position signals from a memory medium which stores data for a predetermined pattern of contour to be machined in the workpiece 5. The position signals from the reader or unit 9 are furnished through an output 9a to a pulse generator 10 where they are converted into drive signal pulses which are distributed into a pair of channels 11 and 12 leading to the motors 7 and 8, respectively. Each channel 11, 12 includes a driver stage 13, 14 where a drive signal pulse is amplified and which applies each amplified drive pulse to the motor 7, 8. Each of the motors 7 and 8 is shown equipped with an encoder 15, 16 which senses the angular position of each motor and applies the sensed signal to an error correction circuit 17, 18 in each channel 11, 12.

A conductor 19 is shown as held in contact with the wire electrode 1 guided on the guide roller 4b to connect the electrode 1 to one pole of an EDM power supply 20 which has the other pole electrically connected to the workpiece 5 for applying a series of time-spaced, discrete electrical discharge pulses through a machining gap G formed between the wire electrode 1 and the workpiece 5 to electroerosively remove material from the workpiece 5. A dielectric machining fluid e.g distilled water, is supplied into the machining gap G from suitable means, e.g. a nozzle 21 as shown. The EDM power supply 20 has a circular 20a for setting parameters of applied discharge pulses, i.e. peak current Ip, pulse duration $\tau$on and pulse interval $\tau$off, which are adjustably fixed. As is well known, these parameters may be varied adaptively in accordance with the machining condition in the gap G. Typically, only the pulse interval $\tau$off is varied but either the pulse duration $\tau$on or the peak current Ip or both may instead or additionally be varied.

Connected also across the tool electrode 1 and the workpiece 5 is a resonant circuit 22 comprising an inductor L and a capacitor C responsive to the presence and absence of discharge occurrences in the machining gap, the oscillations of the resonant circuit being detected by a detector circuit 23 which in turn controls a commutator or relay 24.

In the shunt circuit S of the power supply 20 connecting to the machining gap G, there is provided a resistor 25 which has a current sensor 26 connected thereto for measuring a leakage current through the machining gap G. The current sensor 26 is connected to an indicator 27 which is responsive thereto and is adapted to indicate the machining area of the wire electrode 1 in electroerosive relationship with the workpiece corresponding to the measured current. The current sensor 26 is also adapted to act upon a control setting unit 28 which feeds into the driver circuits 13 and 14 already described.

In operation, while the wire electrode 1 is being continuously passed through the machining zone flushed with the EDM fluid supplied from the nozzle 21, a series of machining pulses are applied across the gap G between the wire electrode 1 and the workpiece 5 to effect electrical discharges removing the material from the workpiece 5. A machining feed should be effected stepwise between the wire electrode 1 and the workpiece 5 by motors 7 and 8 in accordance with the predetermined, programmed machining path information signals supplied by the command source 9.

The command source 9 here is adapted to furnish periodically an interruption signal through its second output thereof 9b to temporarily halt the operation of the motors 7 and 8. After the halting, discharges initially occur regularly but their repetition rates decrease eventually to nil as the machining gap G is broadened as material is removed from the workpiece 5. These conditions, the state at the moment of halting the machining feed and that after the termination of discharges are diagrammatically shown in FIGS. 2(a) and 2(b), respectively.

In the state shown in FIG. 2(a), the resonant circuit 22 responds to the high-frequency components of discharges in the machining gap G and the resonating voltage is detected thereby. In the state of FIG. 2(b), however, the resonating voltage decreases eventually to nil and the absence of this voltage is detected by the detector circuit 23. The latter actuates the commutator 24 to separate the main power circuit M from the machining gap G and connect the shunt circuit S to the machining gap G to make the current sensor 26 operative therein and responsive to the leakage current passing through the machining liquid from the power source 20 in the absence of discharges.

By the measurement of this leakage current, the instantaneous area of the machining surface of the wire electrode 1 in electroerosive relationship with the workpiece 5 is detected. For example, with the pulse voltage V applied from the source 20 being 200 volts, the specific resistivity $\rho$ of the EDM fluid (distilled water) being $5 \times 10^4$ ohm-cm, the spacing g of the machining gap G in the state of FIG. 2(b) being 0.012 mm and the leakage current I detected being 0.1 ampere, one can obtain the machining area S as follows:

$$S = \frac{\rho g I}{V}$$

$$= \frac{5 \times 10^4 \times 0.012 \times 10^{-1} \times 0.1}{200} = 0.03 \text{ cm}^2$$

The machining gap spacing at which a discharge is incapable of taking place is proportional to the applied voltage and since this voltage and the specific resistivity of the machining liquid can all be fixed, the machining area can be determined in proportion to the detected leakage current and can be displayed at the indicator 27. As already noted, the current sensor 25 further acts on the control setting unit 28. When the interruption signal from the command source 9 terminates, the pulse generator 10 is reset and ready for receiving a command signal from the source 9 through the channel 9b whereas a machining-recommence signal is applied by the source 9 through the third channel 9c to the commutator 24 so that the electrical-discharge machining is resumed automatically and proceeds in the machining gap G.

In accordance with important features of the present invention, the machining area signal which develops at the sensor 26 is applied to the control setting unit 28 of each of the driver circuits 13 and 14 for controlling the rate of driving of the motor 7, 8 in accordance with this signal. FIG. 3 diagrammatically shows a driver circuit 13, 14 which comprises a DC source 30 connected across a motor 7, 8 in series with a resistor 31 and a switch 32, shown as a transistor. The switch 32 is turned on when energized with a command drive signal from a pulser 33 which may be a portion of the pulse generator 10.

With the switch 32 turned on, the output of the DC source 30 is pulsed and there develops through the motor 7, 8 a drive current pulse with a duration $\tau$ determined at the pulser 33 and a current magnitude i determined by the resistor 31. The motor 7, 8 will thus be driven by an angle of rotation determined by the drive pulse to displace the workpiece 5 by an incremental distance determined by the angle of rotation of the motor 7, 8. The duration $\tau$ of the command signal pulse at the pulser 33 may be established to achieve the desired angle of rotation of the motor 7, 8 and consequently to achieve the desired increment of displacement, say, 1 $\mu$m. When the machining area varies, however, a change in response of the motor 7, 8 to the drive signal occurs due evidently to a change in the physical conditions, e.g. presumably the expansion pressure of discharge produced gases, in the machining gap G. To compensate for this change in response, the machining area signal may be used to control the rate of driving of the motor 7, 8 for each step of incremental advance of the workpiece 5. The rate of driving may be controlled by controlling the current magnitude i and/or duration $\tau$ of the drive pulse. Thus, the resistance of resistor 31 and the time-constant network of the pulser 33 are variable in response to the machining area sensed by the detector 26.

With a smaller machining area, the resistor 31 is controlled to present a higher resistance and to establish a lower current i and the time-constant network 33 is controlled to present a shorter duration $\tau$ for the drive pulse energizing the motor 7, 8. When the machining area increases, the resistance of the resistor 31 is reduced to increase the current magnitude i and the time-constant network 33 is controlled to establish a greater duration $\tau$ for the drive pulse energizing the motor 7, 8 so as to assure constancy of the actual displacement of the workpiece in each incremental step.

With either of the duration $\tau$on and the peak current Ip of machining discharge pulses which affect on the area of the discharge crater created by each individual machining discharge arranged to be variable, a further compensation for the consequential additional change in response of driving of the motor 7, 8 to each drive pulse is made through a control channel 34 which connects the setting circuit 20a for the EDM power supply to the control setting unit 28 to allow the magnitude i and/or duration $\tau$ to be modified further in response to a change in the duration $\tau$on and peak current Ip of machining discharge pulses. In this case, the control setting unit 28 is arranged to divide the machining area signal from the current sensor 26 by the crater area signal from the setting unit 20a to provide a ratio signal and to act on the resistor 31 and the time-constant network 33 in accordance with the ratio signal.

Figure 4:
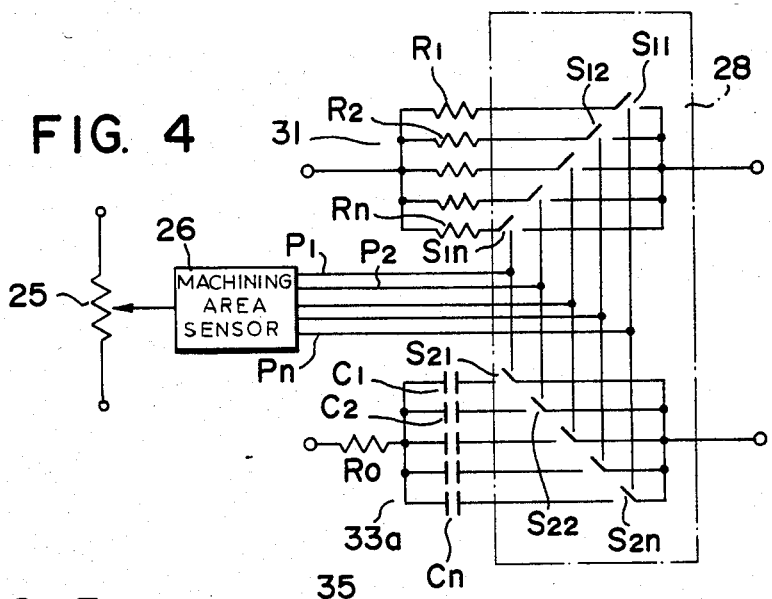
FIG. 4 is a circuit diagram illustrating control portions of the circuit of FIG. 3.

FIG. 4 shows one form of the circuit assembly constituted by the machining area sensor 26, and variable resistor 31 and time-constant network 33a of pulser 33 each of which is associated with the sensor 26. The variable resistor 31 comprises a plurality of parallel resistor branches R1, ... Rn (R1> ..., >Rn) having switches S11, ..., S1n, respectively. The time-constant network 33a of pulser 33 comprises a resistor Ro and a plurality of parallel capacitor branches C1, ..., Cn (C1< ..., <Cn) having switches S21, ... S2n, respectively and connected in series with the resistor Ro. The sensor 26 is fed with a voltage which appears across the sensing resistor 25 and comprises a multi-level threshold circuit, e.g. a multi-level Schmitt-trigger circuit, which is designed to provide one of preset plural outputs P1, ..., Pn depending on the particular range of the machining area detected at the sensing resistor 25. The output P1 indicates a smallest range of the machining area, the output Pn indicates a largest range of the machining area. Between P1 and Pn, progressively increased ranges of the machining area P2, ..., Pn−1 are arranged. The outputs P1, ... and Pn when developed act to close the switches S11, ... and S1n and the switches S21, ... and S22, respectively, to bring into circuit the respective resistors R1, ... and Rn in the setting network 31 and the respective capacitances C1, ..., and Cn in the setting circuit 33a. These different resistors and different capacitors are set to establish the respective values of the current magnitude i and the respective values of the duration $\tau$ for the drive pulse applied to the motor 7, 8. The different values of each of the current magnitude i and the duration $\tau$ are set to correspond to the respective ranges of the machining area so as to assure constancy of the amount of incremental displacement of the motor 7, 8 and hence of the workpiece 5 in spite of change in the machining area during a course of machining feed. When the discharge crater size also varies, the input to the multi-level threshold circuit 26 is replaced by the signal voltage or any other analog variable which indicate the ratio of the machining area to the discharge crater area.

Figure 5:
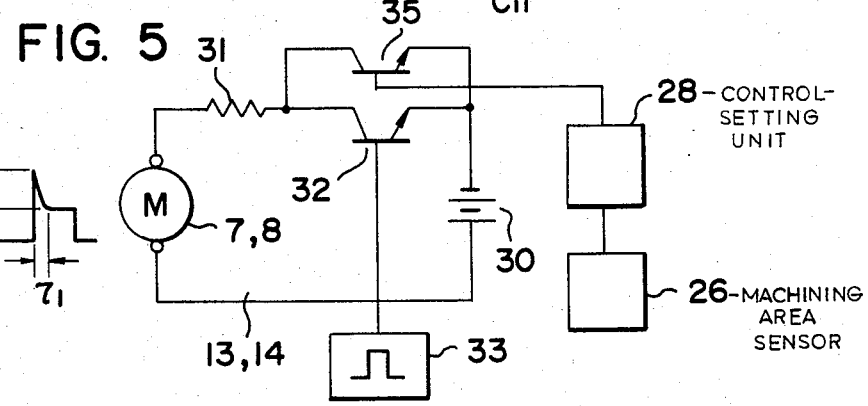
FIG. 5 is a circuit diagram illustrating another motor control circuit according to the invention.

The magnitude of the drive pulse may also be controlledly changed by superimposing upon a main drive pulse of a predetermined base current magnitude io an auxiliary drive pulse i1 for a portion of the main drive pulse, preferably an initial portion as illustrated at the left-hand side of FIG. 5 and changing the magnitude i1 and/or the duration $\tau 1$ of the auxiliary drive pulse in accordance with machining area or ratio signal. In the circuit of FIG. 5, the resistor 31 is fixed and a further transistor 35 is shown connected in parallel with the switching transistor 32. The transistor 35 is turned on with a signal from the setting unit 28 for a duration $\tau 1$ and may designed to act as a variable resistor which determines the current magnitude of the auxiliary drive pulse. The control setting unit 28 is adapted to alter the magnitude of the energizing current for the transistor 35. The transistor 35 may alternatively be of saturation type (i.e. switching type). The control unit 28 is then designed to allow the duration $\tau 1$ to be varied in accordance with the sensed machining area or area ratio.

FIG. 6 shows another embodiment of the present invention in which the rate of response of an electrode-feed driving motor to an input drive signal is controlled in accordance with the instantaneous machining area of an EDM tool electrode juxtaposed with a workpiece. The tool electrode designated at 101 is shown having a stepped machining area designed to be progressively brought into juxtaposition with the workpiece designated at 105 as the tool electrode 101 is advanced uniaxially into the workpiece 105 while a series of electroerosive material removal pulses are applied therebetween from an EDM power supply 120 across a dielectric-filled machining gap G. An incremental electrode-feed signal is derived from a gap servo sensor 140 having a gap signal sensed at a resistor 141 connected in shunt with the gap discharge circuit. The gap signal is compared with a reference level preset in the sensor 140, and a driver circuit 113 is responsive to a deviation signal and furnishes a stepping motor 107 with the incremental feed signal to maintain the size of the machining gap substantially constant.

The machining area sensing system here is designed to sense changes in the average rate of advance of the tool electrode 101 towards and into the workpiece 105 and comprises an encoder or rate generator 142, an integrating counter 143, a set-point generator 144 and a comparator 145. The encoder 142 is coupled with the motor 107 to detect the rate of advance of the tool electrode 101 and to provide pulses proportional in number to the rotation of the motor 107 or a pulse for each incremental distance the electrode 101 is advanced. Tool-advance responsive pulses generated at the encoder 142 are counted by the integrating counter 143 which provides a signal representative of the electrode feed displacement per unit time which is applied to the first input of the comparator circuit 145. The counter 143 is preferably a reversible counter so that signal pulses corresponding to any backward displacement of the tool 101 may be substracted from the counts accumulated in the counter 143. In an EDM operation, the tool electrode may be backmoved or retracted in response to the servo signal which indicates an excessive narrowing of the gap, short-circuiting or abnormality and it is also customary to provide an intermittent retraction of the tool electrode 101 to renew the gap G with the machining fluid for cyclic gap decontamination.

The comparator circuit 145 has its second input supplied with a preset reference signal from the setting circuit 144. The comparator circuit 145 thus provides a comparison of the electrode advance signal per unit time with the reference value, and issues an output signal representing the change in the machining area of the electrode 101 juxtaposed with the workpiece 105. A plurality of different, preselectable reference values are desirably preset at the setting circuit 144 and may be applied sequentially to the comparator circuit 145 by switching means such as that shown later in FIG. 8, so that for every stepwise change in the machining area sensed, an appropriate output signal is provided by the comparator circuit 145. A control setting circuit 128 is used to respond to the output signal of the comparator circuit 145 indicating change in the machining area and is connected to the motor driver circuit 113 to control the rate of driving of the motor 107 in response to each individual stepping feed signal as already described.

In FIG. 7 where same reference numerals are used to designate same parts as shown in FIG. 6, there is shown a modified machining area sensing system which may be used to practice the present invention. The sensing system in this embodiment includes a gap sensor 146 connected to the machining gap G for classifying gap pulses applied in series from the EDM power supply 120 into "OK" (good) and "NG" (no good) pulses and a preset counter 147 for selectively counting the OK pulse. In this case, a gap pulse may be determined to be "OK" unless it is sensed to result in an open-circuit or no-load pulse, arc-discharge or short-circuiting and if it results in a normal accompanying material removal discharge. In this embodiment, a divider 148 is provided having two inputs, the first fed from the counter 143 described in connection with FIG. 6 which provides a pulse accumulation representing the distance of advance of the tool electrode 101 per unit time and the second fed from the counter 147 which provides a signal corresponding to an accumulation of OK pulses for unit time. In order for the two counters 143 and 147 to be synchronized, a timer 149 is provided to apply a timing signal to those counters so that the counting in each is effected at a predetermined, synchronous time interval. The divider 148 accordingly provides a signal representing removal rate divided by the rate of advance of the tool electrode 101 which equals to the instantaneous machining area. If there is a change in the machining area sensed, the control setting circuit 128 responds to execute switch-over of the rate of driving of the motor 107 in the driver circuit as already described.

In FIG. 8 there is shown another system for detecting the machining area and embodying the present invention. This system is designed for use with a tool electrode 101 having a plurality of machining sections with areas A, B and C, respectively, which are progressively enlarged (A<B<C) and stepped in the tool feed or advance direction with each extending perpendicular to the latter. The system makes use of a movable spindle 150 securely supporting the tool electrode 101 and having a horizontal projection 151 attached thereto and a fixed shaft 152 extending in parallel with the spindle 150. On the shaft 152 there are mounted limit switches 153, 154 and 155 whose contacts are adapted to be successively closed in response to the engagement with the projection 151 as the electrode 101 is advanced to place in machining position the machining faces of A, B and C, respectively, relative to the workpiece 105. In this arrangement, the closure of each limit switch 153, 154, 155 is responded to by a control setting unit 128 as already described to act on the motor driver circuit 113 for controlling the rate of response or driving of the motor for incremental displacement of the tool electrode 101 in accordance with change in the machining area sensed.

What is claimed is:

1. In a method of electroerosively machining an electrically conductive workpiece electrode with a tool electrode spacedly juxtaposed therewith across a dielectric-filled machining gap by applying a series of time-spaced electrical discharge pulses through the gap to remove material from the workpiece electrode, wherein a machining feed between the tool and workpiece electrodes, at least one of which is movable, is effected stepwise by motor means drivingly coupled with the movable electrode and arranged to be incrementally driven to advance the movable electrode in successive steps, thereby continuing electroerosive machining in the workpiece electrode and wherein the instantaneous area of the surface of the tool electrode which is in electroerosive relationship with the workpiece electrode varies as machining progresses, the improvement comprising the steps of:
  (a) sensing the varying instantaneous area of said machining surface during the course of said machining feed; and
  (b) controlling the rate of driving of said motor means for each step of incremental advance of the movable electrode in accordance with said sensed area of machining surface so as to maintain the amount of advance displacement of said movable electrode in each incremental step substantially constant over successive steps.

2. The improvement defined in claim 1 wherein said motor means is incrementally driven by energizing the same with a succession of drive pulses and wherein said rate of driving of said motor means for each step of incremental advance of said movable electrode is controlled by controlling said successive drive pulses individually so that each of said drive pulses causes a predetermined substantially constant amount of incremental advance displacement of said movable electrode in spite of a change in said machining area during the continuation of machining.

3. The improvement defined in claim 2 wherein said successive drive pulses are controlled by controlling the magnitude thereof.

4. The improvement defined in claim 2 wherein said successive drive pulses are controlled by controlling the magnitude and duration thereof.

5. The improvement defined in claim 3 or claim 4 wherein the magnitude of said successive drive pulses is controlled during a portion of each drive pulse.

6. The improvement defined in claim 3 or claim 4 wherein each of said successive drive pulses comprises a main drive pulse and at least one auxiliary drive pulse superimposed thereon and the magnitude of said drive pulses is controlled by controlling at least one of the magnitude and duration of said at least one auxiliary drive pulse.

7. The improvement defined in claim 6 wherein said at least one auxiliary drive pulse is superimposed upon said main drive pulse at least in an initial portion of the main drive pulse.

8. The improvement defined in claim 2 wherein said successive drive pulses are controlled by controlling the duration thereof.

9. The improvement defined in claim 2 wherein said motor means includes at least two motors adapted to displace said movable electrode along at least two independent axes, respectively, which extend orthogonally to one another, to permit said machining feed to be effected multi-dimensionally in a coordinate system defined by said axes, further comprising the step of distributing said drive pulses for selective application to said motors in response to command signals to cause said machining feed to follow a predetermined path in said coordinate system.

10. The improvement defined in claim 1 wherein said instantaneous machining area is sensed by temporarily interrupting said machining feed between said tool and workpiece electrodes, continuing the application of said discharge pulses during the interruption until the discharges across said machining gap substantially cease, and, when said discharge across the gap substantially cease, measuring the leakage current across said gap for at least one further applied pulse, said leakage current providing an indication of said instantaneous machining area.

11. The improvement defined in claim 1 wherein said amount of advance displacement of said movable electrode in each incremental step is maintained at a constant value between 0.5 and 5 micrometers over such successive steps.

12. The improvement defined in claim 11 wherein said value is 1 micrometer.

13. The improvement defined in claim 1, further comprising the steps of determining the area of a discharge crater created on the workpiece by an individual discharge pulse whereby the rate of driving of the motor means for each stop of incremental advance of the movable electrode is controlled in step (b) in accordance further with the determined crater area.

14. The method defined in claim 13 wherein the rate of driving is controlled in accordance with the ratio of the sensed instantaneous machining area and the determined discharge crater area.

15. The method defined in claim 13 or claim 14 wherein said discharge crater area is determined by at least one of the duration and peak current of the discharge pulses.

16. In a method of electroerosively machining an electrically conductive workpiece electrode with a tool electrode spacedly juxtaposed therewith across a dielectric-filled machining gap by applying a series of time-spaced electrical discharge pulses through the gap to remove material from the workpiece electrode, wherein a machining feed between the tool and workpiece electrodes, at least one of which is movable, is effected, stepwise by motor means drivingly coupled with the movable electrode and arranged to be incrementally driven to advance the movable electrode in successive steps, thereby continuing electroerosive machining in the workpiece electrode and wherein the instantaneous area of the surface of the tool electrode which is in electroerosive relationship with the workpiece electrode varies as machining progresses, the improvement comprising the steps of:

(a) sensing the varying instantaneous area of said machining surface during the course of said machining feed;

(b) controlling the rate of driving of said motor means for each step of incremental advance of the movable electrode in accordance with said sensed area of machining surface so as to maintain the amount of advance displacement of said movable electrode in each incremental step substantially constant over successive steps, said motor means being incrementally driven by energizing the same with a succession of drive pulses and wherein said rate of driving of said motor means for such step of incremental advance of said movable electrode is controlled by controlling said successive drive pulses individually so that each of said drive pulses causes a predetermined substantially constant amount of incremental advance displacement of said movable electrode in spite of a change in said machining area during the continuation of machining; and for controlling said successive drive pulses, establishing at least one parameter of said successive drive pulses which characterizes each drive pulse and affects on the rate of driving of said motor means thereby for each step of incremental advance of said movable electrode;

establishing a plurality of preselected different values to be selected for said at least one parameter;

establishing a plurality of predetermined different ranges for said varying machining area;

establishing a correspondence respectively between said plural values for said at least one parameter to be selected and said plural ranges for said machining area to be sensed;

in response to said sensed instantaneous machining area, determining, out of said plural ranges, the range in which said sensed area falls;

determining the value for said at least one parameter corresponding to said determined range; and regulating said drive pulse to said motor means so that it acquires said determined value for said at least one parameter.

17. The improvement defined in claim 10, further comprising the step of intermittently interrupting said machining feed to establish a sequence of time periods in which to sense said machining area in step (a).

18. The improvement defined in claim 10, further comprising the step of intermittently interrupting the application of said discharge pulses to establish a sequence of time periods in which to sense said machining area in step (a).

19. The improvement defined in claim 17 or claim 18, further comprising the step of maintaining said controlled rate of driving of said motor means at least during a time interval between one of said time periods to the next.

20. In a method of electroerosively machining an electrically conductive workpiece electrode with a tool electrode spacedly juxtaposed therewith across a dielectric-filled machining gap by applying a series of time-spaced electrical discharge pulses through the gap to remove material from the workpiece electrode, wherein a machining feed between the tool and workpiece electrodes, at least one of which is movable, is effected stepwise by motor means drivingly coupled with the movable electrode and arranged to be incrementally driven to advance the movable electrode in successive steps, thereby continuing electroerosive machining in the workpiece electrode and wherein the instantaneous area of the surface of the tool electrode which is in electroerosive relationship with the workpiece electrode varies as machining progresses, the improvement comprising the steps of:

(a) sensing the varying instantaneous area of said machining surface during the course of said machining feed;

(b) controlling the rate of driving of said motor means for each step of incremental advance of the movable electrode in accordance with said sensed area of machining surface so as to maintain the amount of advance displacement of said movable electrode in each incremental step substantially constant over successive steps; and (c) producing said drive pulses in response in part to a gap signal derived from said machining gap and applying said drive pulses to said motor means, thereby advancing said movable electrode so as to maintain the size of said machining gap substantially constant.

21. The improvement defined in claim 20 wherein said tool electrode has a plurality of machining sections with the respective machining faces stepped in the advance direction with each extending perpendicular thereto and said instantaneous machining area is sensed by detecting the position of said tool electrode corresponding to entry of each of said machining faces into machining relationship with said workpiece electrode.

22. The improvement defined in claim 20 wherein the instantaneous machining area is sensed by detecting the average rate of advance of said movable electrode during application of said discharge pulses.

23. The improvement defined in claim 22 wherein said average rate of advance of said movable electrode is detected by producing a series of pulses each in response to an incremental advance displacement of said movable electrode, determining the number of such incremental pulses in unit time and deriving a control signal therefrom as representative of said average rate of advance for controlling said rate of driving of said motor means for each step of incremental advance of the movable electrode.

24. The improvement defined in claim 23 wherein said number of such incremental pulses in unit time is compared with the number of machining discharge pulses effected across said machining gap to produce said control signal.

25. The improvement defined in claim 23 wherein said number of incremental pulses is counted in an integrating counter whose accumulation level is compared with a reference signal to provide said control signal.

26. An apparatus for electroerosively machining an electrically conductive workpiece electrode with a tool electrode spacedly juxtaposed therewith across a dielectric-filled machining gap, at least one of the tool and workpiece electrodes being movable, which apparatus comprises:

power supply means for applying a series of time-spaced electrical discharge pulses through the gap to remove material from the workpiece;

motor means drivingly coupled with said movable electrode and adapted to be driven incrementally for advancing said movable electrode in successive steps, thereby steppedly effecting a machining feed between the tool and workpiece electrodes while continuing electroerosive machining in the workpiece electrode with the machining surface of the tool electrode which varies in area;

means for sensing the varying instantaneous area of said machining surface which is in electroerosive machining relationship with the workpiece during the course of machining feed; and control means responsive to said sensed varying instantaneous value of machining surface area for acting upon said motor means to control the rate of driving thereof for each step of incremental advance of the movable electrode so as to maintain the amount of advance displacement of said movable electrode in each incremental step substantially constant in spite of a change in the machining area during the continuation of machining.

27. The apparatus defined in claim 26 wherein said motor means is incrementally driven with a drive pulse intermittently furnished from a driver circuit therefor and said control means include means for controlling at least one of the magnitude and duration of said drive pulse.

* * * * *